Dec. 4, 1923.

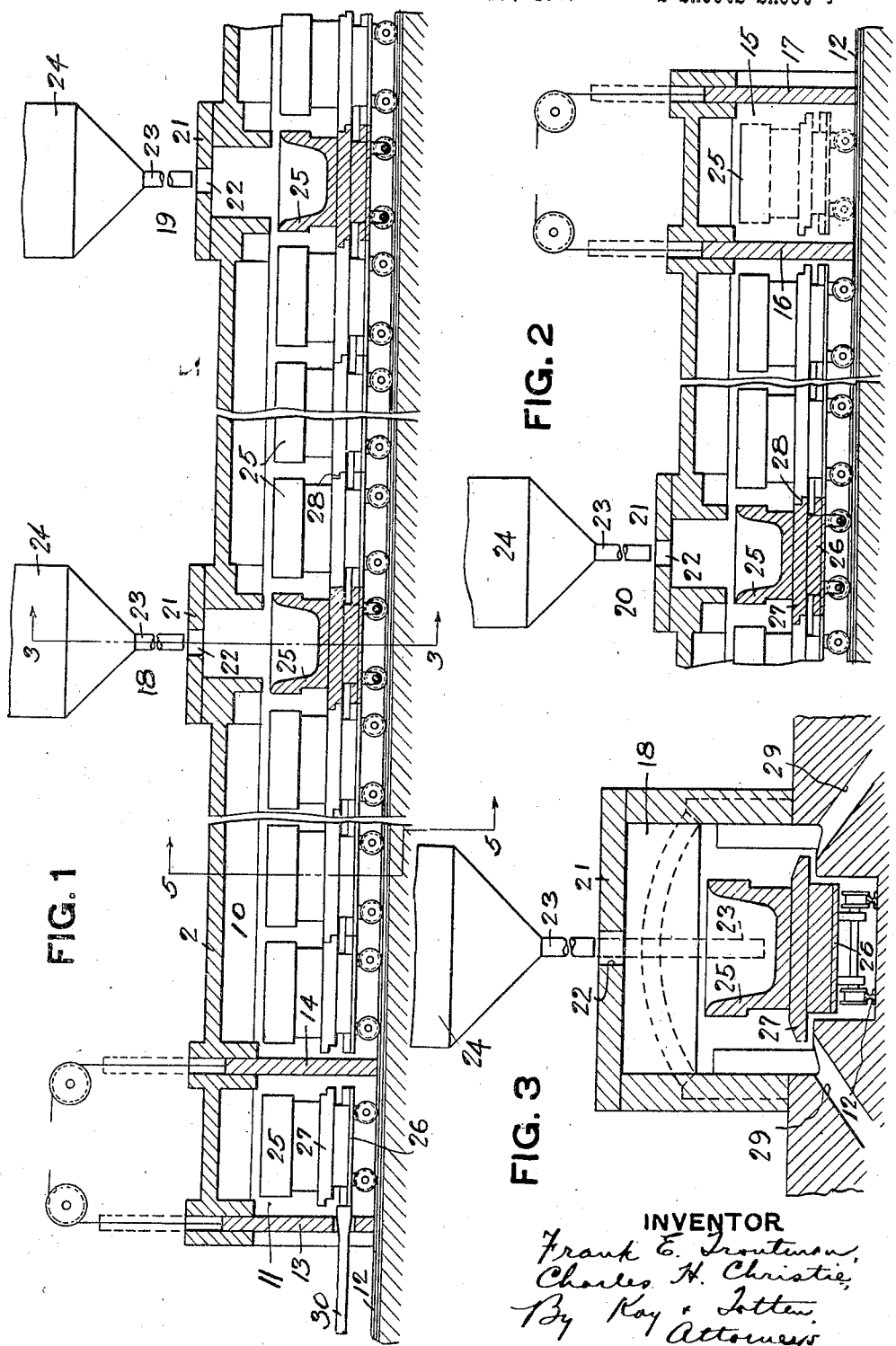

F. E. TROUTMAN ET AL 1,476,432

GLASS MELTING POT FURNACE

Filed March 13, 1920    2 Sheets-Sheet 2

INVENTOR
Frank E. Troutman
Charles H. Christie,
By Kay & Totten, Attorneys

Patented Dec. 4, 1923.

1,476,432

UNITED STATES PATENT OFFICE.

FRANK E. TROUTMAN AND CHARLES H. CHRISTIE, OF BUTLER, PENNSYLVANIA.

GLASS-MELTING-POT FURNACE.

Application filed March 13, 1920. Serial No. 365,484.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Glass-Melting-Pot Furnaces; and we do hereby declare the following to be a full, clear, and exact description thereof.

Our invention relates to a glass melting pot-furnace, and more particularly to a furnace adapted for melting glass in pots for the manufacture of plate-glass.

In the manufacture of plate-glass, the glass which is discharged upon the casting table to be rolled into a plate or sheet is melted in individual pots. These pots are first pre-heated in a furnace built for that purpose and are raised to a temperature of about 1800° F. After this pre-heating, the pots are then introduced into the melting furnace in which the temperature is raised to about 2500° F. to effect the melting of the glass. During this melting operation portions of batch are introduced into the pot by suitable charging apparatus which is introduced through an opening in the side-wall or roof of the furnace, and by means of which batch is discharged into the pots until the proper amount has been introduced into each pot to obtain a pot full of molten glass. After the melting stage has been reached, the temperature of the glass is raised to approximately 2600° F., when the "fining" of the glass takes place. When the glass is "finished" the temperature of the furnace is then reduced so that the glass, when the pot is removed for pouring, has a temperature of about 2000°. At this temperature the glass is in the right state of fluidity for rolling when discharged upon the casting table.

The object of our invention is to provide a pot-furnace of this character in which the pots instead of being introduced into a furnace and remaining in a stationary position during the melting and fining as well as the adding of the batch from time to time, the pots are moved intermittently through the furnace, passing from one area to another of increasing temperature, the additions of batch being made from time to time so that the plurality of pots may be successively filled, the glass melted and fined therein and partially cooled while the pot is moving through the furnace so that when the pot reaches the outlet, the glass is in condition for pouring on the casting table.

To these ends, our invention comprises the novel features hereinafter set forth and claimed.

Figure 4:
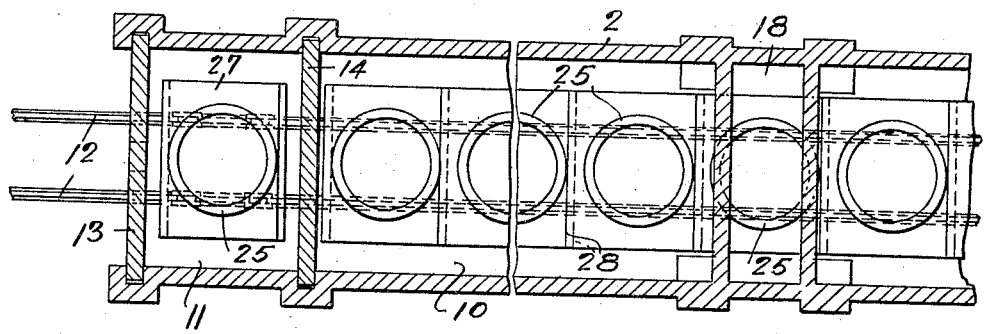
Figure 5:
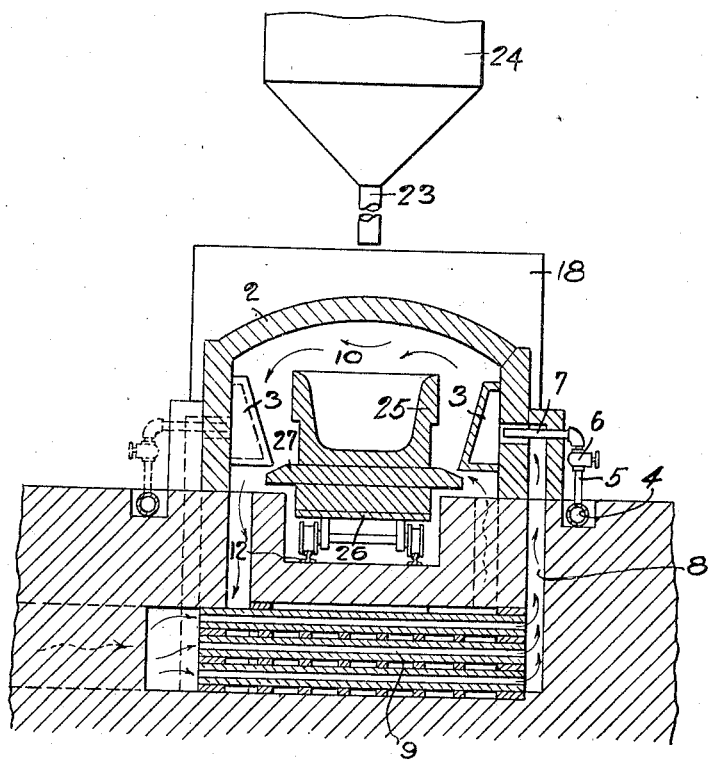

In the accompanying drawings, Fig. 1 is a side elevation in section of a portion of our improved pot furnace; Fig. 2 shows the discharge or rear end of the furnace; Fig. 3 is a cross section on the line 3—3, Fig. 1; Fig. 4 is a plan view of a portion of the furnace; and Fig. 5 is an enlarged view on the line 5—5, Fig. 1.

In the drawings, the numeral 2 designates the heating furnace which may be of the muffle type with the combustion chambers 3 extending along the side walls. Where gas is employed as a fuel, the gas line 4 extends along the side of the furnace, and branch pipes 5 controlled by valves 6 extend from said main line at intervals. The burners 7 are connected up to the branch pipes 5. Air to support combustion is fed to the burners by the flues 8 which are connected up with an ordinary recuperator 9. Any suitable manner, however, of heating the melting chamber 10 may be employed.

At the front end of the furnace is the vestibule 11 with the tracks 12 leading into said vestibule being provided with the outer door 13 and the inner door 14. The track 12 extends the entire length of the furnace and at its rear or discharge end, a vestibule 15 is provided with doors 16 and 17. At intervals charging stations 18, 19 and 20 are provided, the number of said charging stations being dependent only on the length of the furnace or the amount of material added at each station. At these charging stations the top plates 21 are provided with openings 22 to receive the discharge spouts 23 of the hoppers 24 containing the batch. The openings may be formed in the walls of the furnace if desired. These hoppers may be fed by suitable overhead carriers for delivering batch to the different hoppers as required. In order to provide for the discharge of the batch well down in the pots 25, the spouts 23 are made adjustable in length so as to be extended or withdrawn as desired, and so as not to interfere with the movement of the pots which are carried on the trucks 26.

The pots 25 rest upon the refractory supports 27, the front and rear ends of said supports being rabbeted as at 28 so that when passing through the furnace, the several supports of the different trucks will form a rabbeted joint with each other.

At the charging stations overflow gutters 29 are provided for any overflow from the pots at the charging station. These may also be provided at other places in the furnace to take care of leaking pots.

A suitable charger or pusher 30 may be provided at the front end of the furnace for advancing the trucks, and each time a truck is advanced from the vestibule 11 into the main part of the furnace by raising the door 14 the advance of said truck coming in contact with the preceding truck will advance the whole line of trucks the distance of the length of one of the supports 27. In this manner, the trucks are moved intermittently through the furnace. Other means of moving the trucks may of course be employed.

In carrying out our invention, the pots in the first instance having been pre-heated to the proper temperature either in a separate heating chamber or with the heat acquired by having been passed through the furnace and discharged of their lot of molten glass, are introduced one by one into the furnace passing first into the vestibule 11. The door 13 is then closed and the door 14 opened whereupon a pusher 30 advances the pot into the main heating chamber of the furnace. The pots as they are advanced in this intermittent manner are gradually raised in temperature and at the first charging station 18 the first charge of batch is introduced into the pot. This batch is partially melted before reaching the second charging station where a second portion of batch is introduced and again at the third or succeeding charging stations. The temperature of the furnace is increased and has different zones of heat, the temperature for instance at the first charging station being, say, 2200° F. and gradually raising to 2500° F. between the first and second charging stations and kept at approximately that temperature until the third charging station is reached, and from there on where the finishing or "fining" of the glass takes place the temperature is raised to approximately 2600° F. These temperatures are, of course only approximate or relative, and we do not wish in any sense to be limited to the temperatures stated.

After finishing or fining of the glass which takes place after the last addition of batch, the pot passes into a cooler zone and then into the rear vestibule 15 where the temperature of the glass is the proper temperature for pouring, when the door 17 is raised and the pot passes from the furnace to be taken to the casting table where the glass, after being discharged, is rolled out into a plate or sheet in the ordinary manner.

In our invention, the operation of melting glass in pots, is a continuous one as the pot just emptied is immediately transferred to the front end of the furnace where it is admitted and passed through the different zones of heat with the admission from time to time of the batch, the pot in this manner being used in continuous cycles so that there is no delay and greater output is obtained. Furthermore, the charging of the pots as they move along in this manner from time to time, is done without the loss of practically any heat, and without the danger of chipping the pots by the introduction of charging ladles, as in the old method where the ladle is liable to strike the top edge of the pot and portions of the pot dropped into the molten glass which results in imperfect glass.

The method of melting glass, as above set forth, forms the subject matter of an application filed by me of even date herewith, Serial No. 365,483.

What we claim is:

1. A continuous pot-furnace for melting glass having charging openings for the admission of batch, means for bringing the pots in succession into register with said openings, and means for introducing the pots into said furnace and removing the pots therefrom without opening the heating chamber of said furnace to the outer air.

2. A continuous pot-furnace for melting glass having a plurality of moving carriers therein, means for charging batch into said pots at intervals in said furnace, means for varying the temperature at different portions of said furnace, and means for introducing the pots into said furnace and removing the pots therefrom without opening the heating chamber of said furnace to the outer air.

3. A continuous pot-furnace for melting glass having movable carriers therein for supporting the pots, means for charging the pots with batch at different points in said furnace, means for controlling the temperature of said furnace at all points whereby the glass in said pots in their passage through said furnace is brought to the melting and fining and casting temperatures, and means for introducing the pots into said furnace and removing the pots therefrom without opening the heating chamber of said furnace to the outer air.

4. A continuous pot-furnace for melting glass having movable carriers therein for supporting the pots, means for charging the pots with batch at different points in said furnace, means for controlling the temperature of said furnace from the front toward the rear, whereby the pots in their passage through said furnace are gradually heated to the melting and fining temperatures, and partially cooled for casting, and means for introducing the pots into said furnace and removing the pots therefrom without changing the temperature conditions within said furnace.

5. A continuous pot-furnace for melting glass having a charging opening for the admission of batch, a batch container, and a vertically adjustable conductor leading therefrom through said opening into one of the pots in said furnace below the upper rim of said pot.

6. A continuous pot-furnace for melting glass, a plurality of movable carriers therein for supporting the pots, means for advancing said carriers intermittently, means for charging said pots with batch at intervals in their passage through said furnace, and vestibules disposed at the charging and discharging ends of said furnace for permitting the pots to be introduced and removed without exposing the interior of the furnace to the outer air.

7. A continuous pot furnace for melting glass having a plurality of charging openings in the roof thereof for the admission of batch and vestibules disposed at the charging and discharging ends of said furnace for permitting the pots to be introduced and removed without exposing the interior of the furnace to the outer air.

8. A continuous pot furnace for melting glass having charging openings in the roof thereof for the admission of batch, and means for bringing the pots into succession into register with said openings.

In testimony whereof, we, the said FRANK E. TROUTMAN and CHARLES H. CHRISTIE, have hereunto set our hands.

FRANK E. TROUTMAN.
CHARLES H. CHRISTIE.

Witnesses:
WM. F. RAUSCHENBERGER,
A. J. GUMPPER.